Patented Apr. 3, 1934

1,953,760

UNITED STATES PATENT OFFICE 1,953,760

PROCESS OF PREPARING VITREOUS ENAMEL SLIPS

Robert Maynard King, Columbus, Ohio, assignor to National Aluminate Corporation, Chicago, Ill., a corporation of Delaware No Drawing. Application April 4, 1932, Serial No. 603,210

4 Claims. (Cl. 106—36.2)

The present invention relates to improvements in the preparation and conditioning of slips such as are used in the art of enameling, the principal purpose of the invention being to "set up" the enamel slip so that it will drain properly and not run or produce an uneven coating when applied to the articles that are to be enameled, so that upon firing of the articles the enamel will form a smooth and even coating on the ware to which the slip was applied.

One of the objects of the invention is to produce enamel slips suitable for application to metallic articles, and to improve their quality by the expedient of adding sodium aluminate to the vitreous enamel batches.

I have found that the use of a soluble aluminate such as sodium aluminate in vitreous enamel slips will greatly improve their quality and will enable more rapid, economical and perfect enameling to be accomplished with ordinary enamel constituents.

Enamel mill batches usually consist of: the enamel glass—the so-called frit; opacifying agents, usually inert as regards effect on enamel composition, and the amount added may vary; clay, usually added in the amount of from 6% to 8% of the weight of frit (the kind and amount of clay added affects the processing of the enamel both before and after firing); the "setting-up" agent, the commonly used "setting-up" agents being borax, magnesium carbonate, magnesium sulphate, alums, acids, and a few organic compounds (these are added in amounts varying from 0.05% to 1.25% of the frit weight); water, in amounts necessary to produce the required specific gravity and application properties.

The function of the "setting-up" agent is to aid the suspension of the enamel glass or frit through its action on the clay and to aid in giving the enamel slip proper consistency for satisfactory application to the metal, either by spraying of the slip on the ware or by immersing the ware in the slip.

It is required that an enamel "set-up" produce the following properties in a slip: satisfactory suspension of frit; proper consistency; application resulting in even coating of desired thickness; no defects in fired ware traceable to "setting-up" agent; stability of condition upon aging as regards the preceding properties.

The use of sodium aluminate as the "setting-up" agent in some types of enamels offers an improvement over the use of the "setting-up" agents in common use.

In acid resisting enamel slips the commonly used "setting-up" agent is potassium alum, this being a satisfactory agent. However, the use of alum or any agent containing the (SO₄) sulphate radical tends to produce a poor gloss on the fired ware. This fact is probably the chief reason for the limited use of acid resisting enamels to date. Also, alum or sulphuric acid when used with acid resisting enamels produces a relatively unstable "set-up". The slip rapidly becomes more fluid and requires repeated additions of the "setting-up" agent, and also with most enamels becomes incapable of being evenly applied to the metal sheets. This application defect is known in the industry as "slumping," "shore-lining," or "double draining" according to the way in which it manifests itself. In all cases the defect is essentially an uneven coating.

The use of sodium aluminate in acid resisting enamel slips has been found, both in laboratory trials and larger scale industrial trials on commercial ware, to offer the following advantages:

It produces slips having the proper consistency and properties for application, without any defects apparent on application. It gives much greater stability to the slip as regards all properties over aging time intervals—much greater than allowable with slips containing alum as the "set-up", this time interval over which stability is obtained being much greater than would ever be required in commercial practice. It gives a gloss to the finished enamel far superior to that obtained with the same enamel that has been "set-up" with potassium alum.

The amount of sodium aluminate required to give the best results is 0.25% of the frit weight. This amount, however, can be increased to as much as 1.25%, depending on the type or fluidity of "set-up" required, without any deleterious effects being observed. The decrease in fluidity for increasing amounts of "set-up" is much less for sodium aluminate than with alum. This offers the additional advantage of easier control.

It is probable that the aluminum hydroxide formed as the result of the hydrolysis of the sodium aluminate is one of the factors accounting for the effectiveness of the aluminate in bringing about these improvements.

It could not have been foreseen that an alkaline-reacting material, such as sodium aluminate, would present any advantages over an acid-reacting substance such as potassium sulphate, alum, or other similar substances. Borax, which is the only soluble non-acid type of setting-up agent used in the past in this art, has no analogy to sodium aluminate, which appears to be unique in its properties.

No examples of particular types of frits are given, as these of course vary very widely in composition, according to the color and nature of the material that is being enameled as well as the purpose for which the enameling is carried out. The essential feature of the invention therefore resides in the use of the relatively small amounts of sodium aluminate employed. As the percentage of aluminate given above is based on the dry weight of the slip-contents, the calculation of the amount required is well within the skill of the operators working in this art.

I claim:

1. In the process of enhancing the setting-up properties of vitreous enamel slips the step of adding thereto a small amount of sodium aluminate.

2. In the process of preparing slips for application to articles that are to be provided with a vitreous enamel, the step of adding to the slip a small amount of sodium aluminate.

3. In the process of improving the quality of vitreous enamel slips the step of adding thereto from 0.25% to 1.25% of sodium aluminate on the basis of the dry weight of the frit-constituent.

4. In the process of "setting-up a vitreous enamel slip the step of adding thereto a small amount of sodium aluminate.

ROBERT MAYNARD KING.